(12) United States Patent
Asthana (10) Patent No.: US 7,593,364 B2
(45) Date of Patent: *Sep. 22, 2009

(54) METHOD AND APPARATUS TO PROVIDE EFFICIENT PAGING FOR A NETWORK INITIATED DATA SESSION

(75) Inventor: Sarvesh Asthana, San Diego, CA (US)

(73) Assignee: Nokia Corporation, Espoo (FI)

( * ) Notice: Subject to any disclaimer, the term of this patent is extended or adjusted under 35 U.S.C. 154(b) by 871 days.

This patent is subject to a terminal disclaimer.

(21) Appl. No.: 10/722,964

(22) Filed: Nov. 26, 2003

(65) Prior Publication Data

US 2005/0111400 A1    May 26, 2005

(51) Int. Cl.
 *H04W 4/00* (2006.01)
(52) U.S. Cl. .................... 370/328; 455/456.1
(58) Field of Classification Search ................ 370/328, 370/329, 331, 338; 455/422.1, 432.1, 435.1, 455/436, 456, 456.1, 456.2, 456.4, 456.5, 455/456.6, 458
See application file for complete search history.

(56) References Cited

U.S. PATENT DOCUMENTS

| 6,272,129 | B1 | 8/2001 | Dynarski et al. ............ 370/356 |
| 6,707,809 | B1 | 3/2004 | Warrier et al. ............. 370/351 |
| 2001/0050907 | A1* | 12/2001 | Madour et al. ............. 370/329 |
| 2002/0075823 | A1* | 6/2002 | Lee et al. ................. 370/328 |
| 2003/0129980 | A1* | 7/2003 | Sayeedi .................... 455/435 |
| 2004/0022212 | A1* | 2/2004 | Chowdhury et al. ........ 370/329 |
| 2004/0157619 | A1 | 8/2004 | Corson et al. ............ 455/456.1 |
| 2004/0179492 | A1 | 9/2004 | Zhang et al. ............... 370/331 |
| 2005/0128990 | A1 | 6/2005 | Eom et al. ................ 370/338 |
| 2006/0126589 | A1* | 6/2006 | Sayeedi .................... 370/338 |

OTHER PUBLICATIONS

Ke-Chi Jang et al.; "Mobile Paging with Mobile Station Sub-Paging Zone Update"; 3GPP2 cdma2000 TSG-C (Nortel Networks, 2003, C23-20030714-038R3).

* cited by examiner

*Primary Examiner*—Ricky Ngo
*Assistant Examiner*—Wei-Po Kao
(74) *Attorney, Agent, or Firm*—Harrington & Smith, PC (57) ABSTRACT

A method is disclosed to operate a wireless network (20) with a MS (100) and includes, in response to detecting that the MS has changed its location in the wireless network, registering the MS with a BS (45) to indicate the current location of the MS and, in response to the MS registering with the BS, triggering the sending of messages in the wireless network until information that is indicative of the current location of the MS is recorded by an AAA server (80). The AAA server can be subsequently queried to obtain the current location of the MS, such as when a network initiated data session (NIDS) for the MS is initiated. Also disclosed is a method to page a MS by, in response to the initiation of a NIDS for the MS, querying a home AAA server for a current BS/PCF/PDSN affiliation of the MS and sending a page message to the MS in accordance with the current BS/PCF/PDSN affiliation of the MS.

24 Claims, 5 Drawing Sheets

METHOD AND APPARATUS TO PROVIDE EFFICIENT PAGING FOR A NETWORK INITIATED DATA SESSION

TECHNICAL FIELD

This invention relates generally to packet data communications systems having mobile nodes and, more specifically, relates to techniques for sending paging messages to a mobile node, in particular a mobile node that is in an Idle state.

BACKGROUND

Figure 1A:
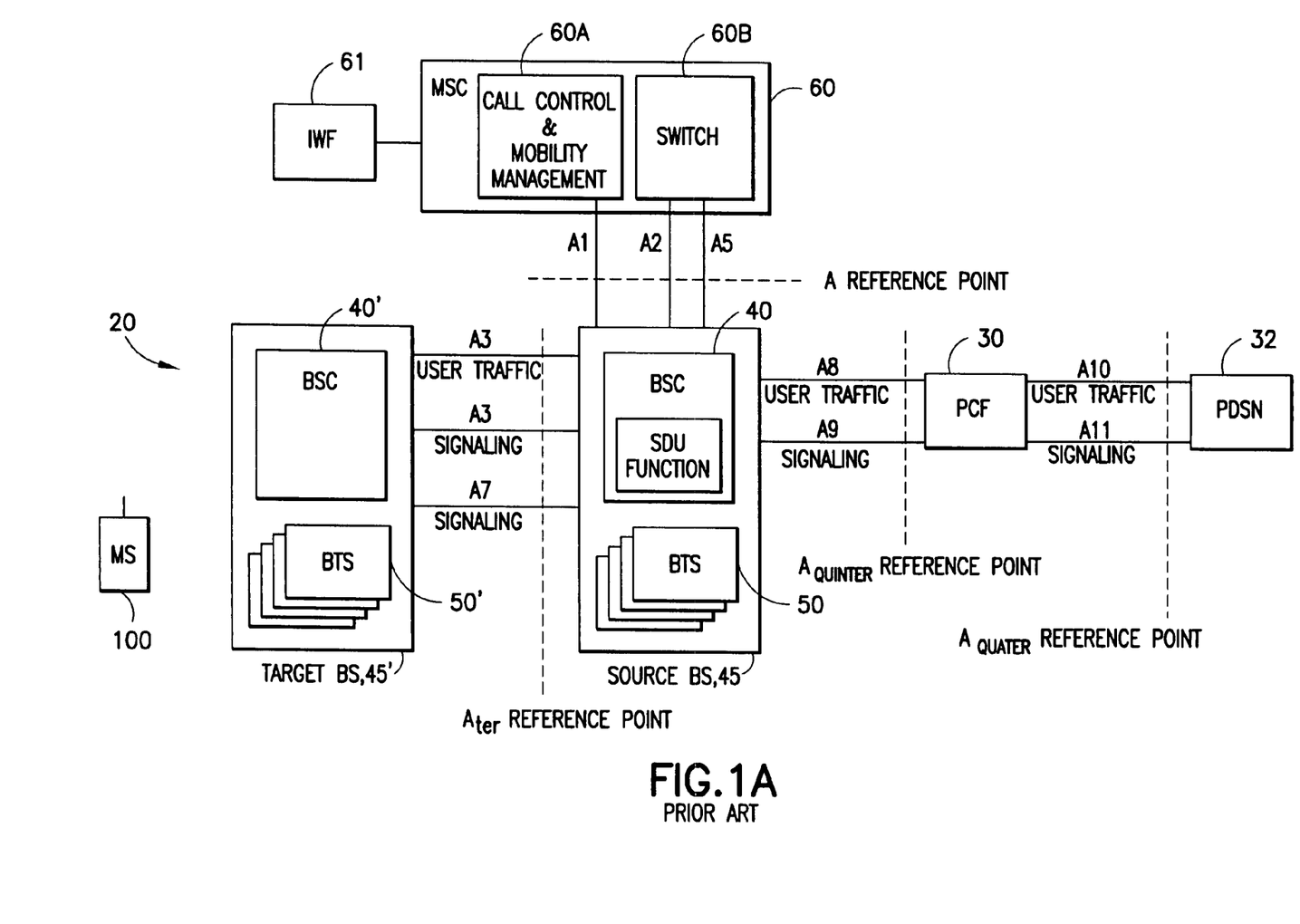
FIGS. 1A and 1B are block diagrams that illustrate conventional wireless network functional components and the interfaces between them.
Figure 1B:
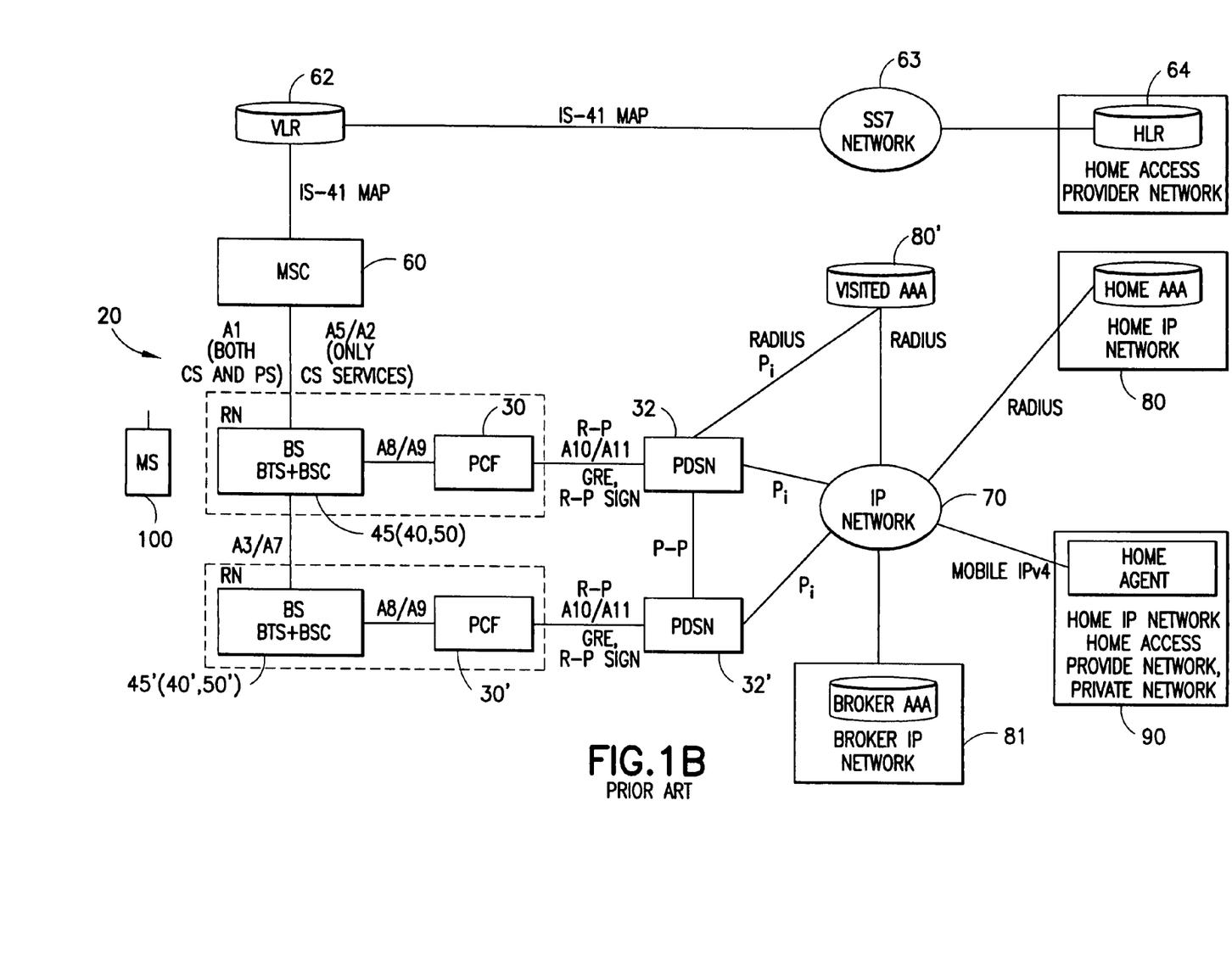

The following abbreviations are herewith defined for the purposes of this patent application:
  3GPP Third Generation Partnership Project
  AAA Authentication, Authorization and Accounting
  BSC Base Station Controller
  BS Base Station
  BTS Base Transceiver Station
  CDMA Code Division, Multiple Access
  CN Correspondent Node
  CS Circuit Switched
  GRE Generic Routing Encapsulation
  HA Home Agent
  HLR Home Location Register
  IMSI International Mobile Subscriber Identity
  IP Internet protocol
  IWF Inter-Working Function
  LDAP Lightweight Directory Access Protocol
  MN Mobile Node
  MS Mobile Station
  MSC Mobile Switching Center
  NAI Network Access Identifier
  NIDS Network Initiated Data Session
  PCF Packet Control Function
  PDSN Packet Data Serving Node
  PPP Point to Point Protocol
  PS Packet Switched
  PZID Packet Zone ID
  RADIUS Remote Authentication Dial-In User Service
  RN Radio Network
  RP Radio Protocol
  SDU Service Data Unit
  SPZ Sub-Paging Zone
  SPZ_ID Sub-Paging Zone Identifier
  SQL Structured Query Language
  VLR Visitor Location Register FIGS. 1A and 1B illustrates major functional components and the interfaces of a conventional wireless network 20 suitable for operation with a MN or MS 100. Beginning with FIG. 1A, a source BS 45 includes a BSC 40 and a plurality of BTSs 50. The BSC 40 includes a SDU function that operates to identify the information transferred between peer layer entities which is not interpreted by supporting lower layer entities. On the voice side the BS 45 is coupled to a MSC 60, more specifically it is coupled via an A1 interface (both CS and PS services) to a MSC call control and management function 60A and via A2 and A5 interfaces (CS services only) to a MSC switch 60B. The MSC 60 is shown coupled to an IWF 61. The BS 45 may also be coupled via interfaces A3 (user traffic), A3 and A7 (signalling) to a target BS 45', containing an associated BSC 40' and BTSs 50'. On the data side the BS 45 is coupled to a PCF 30 via interfaces A8 (user traffic) and A9 (signalling). The PCF 30 is a component of the radio access network that controls the transmission of packets between the BS 45 and a PDSN 32. The PDSN 32 is responsible for the establishment, maintenance and termination of a PPP session towards the MN. It may also assign dynamic IP addresses in addition to supporting Mobile IP functionality. It provides a similar function to the GSN (GPRS Support Nodes) found in the GSM and UMTS networks. The interfaces between the PCF 30 and the PDSN 32 are designated A10 (user traffic) and A11 (signalling), and include GRE and R-P sign capability.

FIG. 1B illustrates further aspects of the wireless network 20. For example, the MSC 60 is shown connected via an IS-41 MAP interface to a VLR 62, which in turn is coupled via the IS-41 MAP to a SS-7 (signalling system seven) network 63 and thence to a HLR 64. The PDSN 32 is coupled to an IP network 70, and through the IP network 70 to a home AAA 80 and to a HA 90 (e.g., a home IP network a home access provider network, or a private network). The AAA 80 is generally a function that is used to identify a user and the user's privileges, and to record and track that user's activities. The PDSN 32 can also be coupled to a visited AAA 80', and to one or more broker AAAs 81. Note that the target BS 45 associated with a target RN is shown to also include a PCF 30' and a PDSN 32', also coupled to the IP network 70.

Those skilled in the art should appreciate that the foregoing description of the wireless network 20 shown in FIGS. 1A and 1B is not intended to be an exhaustive study of wireless networks, but has been provided simply to place the ensuing discussion and description of this invention into a technological context and framework.

In order to provide an "Always On Service" the network 20 is required to push data to the MS 100. However, the CDMA network architecture as currently defined by 3GPP-2 does not include a capability for the wireless network 20 to push data to a MS 100 that is on an Idle state or mode. If the MS 100 is instead in the Active/Dormant (i.e., non-Idle) state, the PDSN 32 has knowledge of the location of the Ms 100 because of the RP session with the PCF 30.

However, for a MS 100 in the Idle state there is no corresponding RP session. A data session needs to be initiated by the MS 100 and, at present, there is no defined way for the network 20 to initiate the session set up. As such, it can be appreciated that one of the problems that arise in a network-initiated session set up is to locate the MS 100 in the network 20.

On the voice side of the network the MSC/HLR 60, 64 have exact location information for the MS 100. Thus, when a mobile terminated voice call needs to be delivered the HLR 64 is contacted to obtain the current location information, and the MS 100 is then paged efficiently by the correct group of BTSs 50. On the data side, however, the packet core network elements have data that needs to be pushed to the MS 100, but there is no interface to the HLR 64 (as can be seen in FIG. 1B). Also, in order to deliver the packet data the correct PDSN 32, PCF 30 and BSC 40 combination should be selected so that the page messages can be sent out efficiently.

It can be noted that even if there were an interface to the HLR 64 from the packet core network elements, the HLR 64 does not have the MS 100 location information in terms of the correct PCF 30 and PDSN 32 combination.

Figure 2:
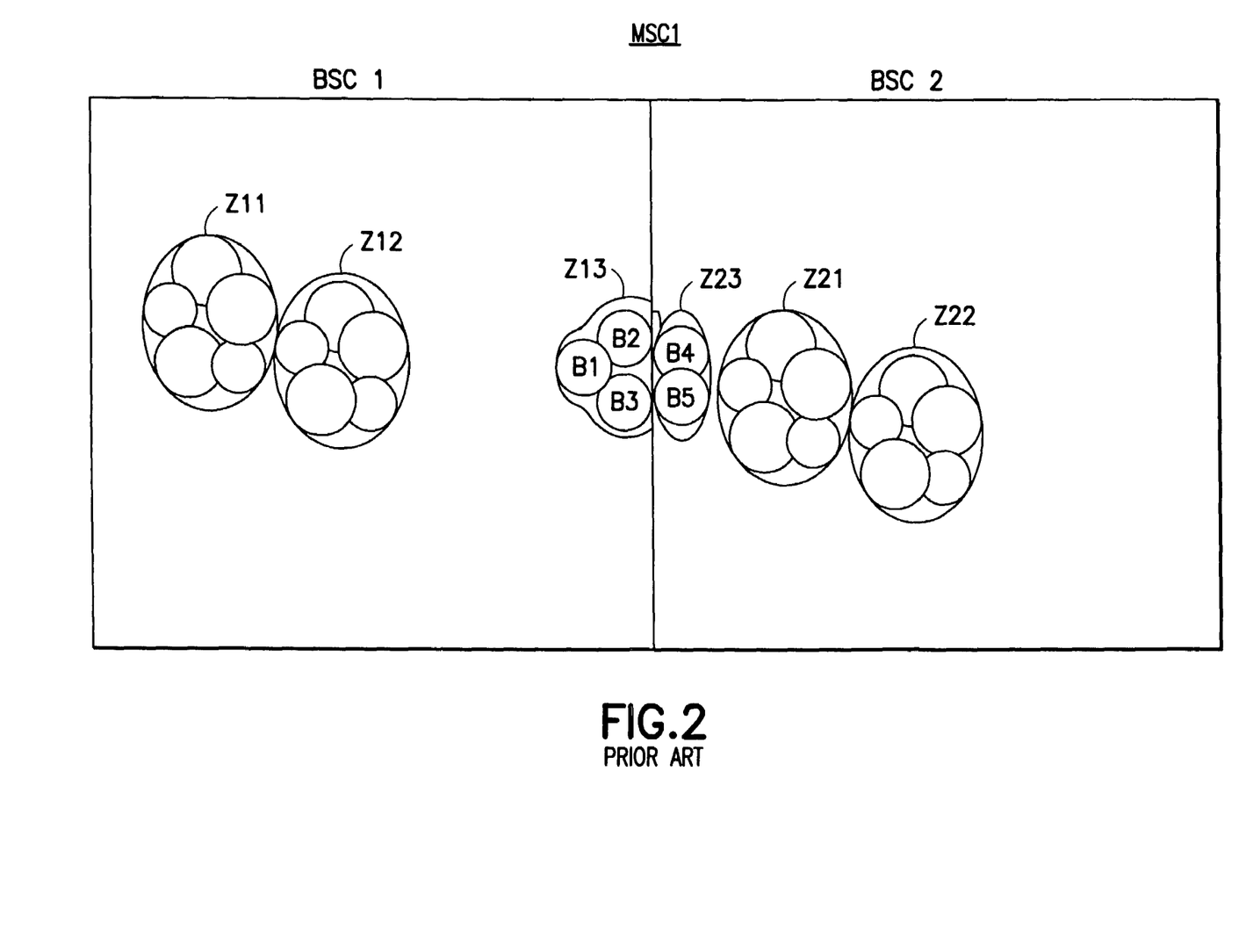
FIG. 2 is a diagram from the prior art that shows various zones associated with two BSCs and one MSC.

There has been a proposal to address this problem between the PCF 30 and the BSC 40 (using the A8 and A9 interfaces). Reference in this regard can be made to a document: 3GPP2 cdma2000 TSG-C, entitled "Mobile paging with mobile station sub-paging zone update", Ke-Chi Jang et al. (Nortel Networks, 2003, C23-20030714-038R3). This document proposes an efficient way to enable a BS 45 to page a MS 100 in a smaller area. It is said that a registration zone is adequate for voice services, but for packet data service the BS 45 may need to track the MS 100 to a smaller sub-paging zone to achieve a more efficient dormant to active transition. To improve the paging with a smaller SPZ, it was proposed to broadcast a SPZ_ID in an overhead message. The MS 100 that supports this feature reports its location on the R-CSCH (Reverse Common Signaling Logical Channel, a logical channel that carries higher layer signaling traffic from the MS to the BS over a common physical channel) when it detects a SPZ change. The service provider configures the size of the SPZ, and all BSs 45 in the same SPZ have the same zone value. Based on the report from the MS 100, a network 20 with BSC 40 level control can page the MS 100 within the zone where the MS 100 sends the location report over the R-CSCH. FIG. 2, based on a figure in the C23-20030714-038R3 document, shows the various possible scenarios.

However, an unfulfilled need still exists to enable the data side of the network 20 to obtain the current BSC/PCF/PDSN association of an Idle MN, without requiring that the voice side of the network be contacted.

SUMMARY OF THE PREFERRED EMBODIMENTS

The foregoing and other problems are overcome, and other advantages are realized, in accordance with the presently preferred embodiments of these teachings.

This invention provides for locating the MS in terms of a BSC/PCF/PDSN association by providing the data side of the network with MS location information. This is done by the MS, when in an Idle state, registering autonomously with the network when there is a change in the SPZ_ID or PZID values.

The invention provides a technique to determine the exact location of the MS so that the data side of the network can send page messages through the best possible BSC/BTSs, without having to request location information from the voice side of the network, such as from the MSC/HLR.

In one aspect this invention provides a method to operate a wireless network with a MS, and includes, in response to detecting that the MS has changed its location in the wireless network, registering the MS with a BS to indicate the current location of the MS and, in response to the MS registering with the BS, triggering the sending of messages in the wireless network until information that is indicative of the current location of the MS is recorded by an AAA server.

In another aspect this invention provides a method that operates a wireless network with the MS and includes, in response to detecting that the MS has changed its location in the wireless network, and that the MS is in an Idle state, sending a message from the MS to the BS, the message indicating the current location of the MS, and triggering the sending of further messages in the wireless network from the BS to a PCF, and from the PCF to a PDSN, and from the PDSN to an AAA server, such that information that is indicative of a current BS/PCF/PDSN affiliation of the MS at the current location of the MS is recorded by the AAA server.

A further aspect of this invention is a method to operate a wireless network with a MS that includes, in response to receiving a Registration message from the MS at a BS, the Registration message containing a sub-paging zone identifier SPZ_ID, sending further messages in the wireless network from the BS to the PCF, from the PCF to the PDSN, and from the PDSN to the AAA server, such that information that is indicative of a current location of the MS is recorded by the AAA server. The method further includes, in response to an occurrence of a network initiated data session (NIDS) for the MS, querying the AAA server to obtain at least the current location of the MS.

Also disclosed is a wireless network operable with a MS. The wireless network includes the BS that is responsive to receiving a Registration message from a MS that contains a sub-paging zone identifier SPZ_ID, for sending a message from the BS to a PCF via an A8/A9 interface. The PCF, in response to receiving the message from the BS, sends a message to a PDSN via an A10/A11 interface. The PDSN, in response to receiving the message from the PCF, sends a message to a home AAA server via one of a Lightweight Directory Access Protocol LDAP interface, or a JAVA/SQL interface, or possibly a modified RADIUS interface that includes change information to be sent asynchronously to the AAA server. The home AAA server records information that is indicative of a current location of the MS, and is responsive to a query received in response to an occurrence of a NIDS for the MS for returning at least the current location of the MS.

Also disclosed is MS operable in a wireless network for transmitting a Registration message to a BS, the Registration message containing a sub-paging zone identifier SPZ_ID. In response, the BS sends a message to a PCF. The PCF, in response to receiving the message from the BS, sends a message to a PDSN that, responsive to receiving the message from the PCF, sends a message to a home AAA server. The home AAA server recording information that is indicative of a current location of the MS, and is further responsive to a query received in response to an occurrence of a network initiated data session (NIDS) for the MS, for returning at least the current location of the MS for enabling data to be received by the MS at its current location.

Also disclosed is a BS operable in a wireless network for receiving a Registration message from a MS, the Registration message containing a sub-paging zone identifier SPZ_ID. The BS, in response to receiving the Registration message, sends a message to a PCF. The PCF, in response to receiving the message from the BS, sends a message to a PDSN that, responsive to receiving the message from the PCF, sends a message to a home AAA server. The home AAA server recording information that is indicative of a current location of the MS, and is further responsive to a query received in response to an occurrence of a NIDS for the MS, for returning at least the current location of the MS for enabling data to be received by the MS at its current location via the BS.

In a still further aspect this invention provides a method to page a MS by, in response to the initiation of a NIDS for the MS, querying a home AAA server for a current BS/PCF/PDSN affiliation of the MS; and sending a page message to the MS in accordance with the current BS/PCF/PDSN affiliation of the MS.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 3:
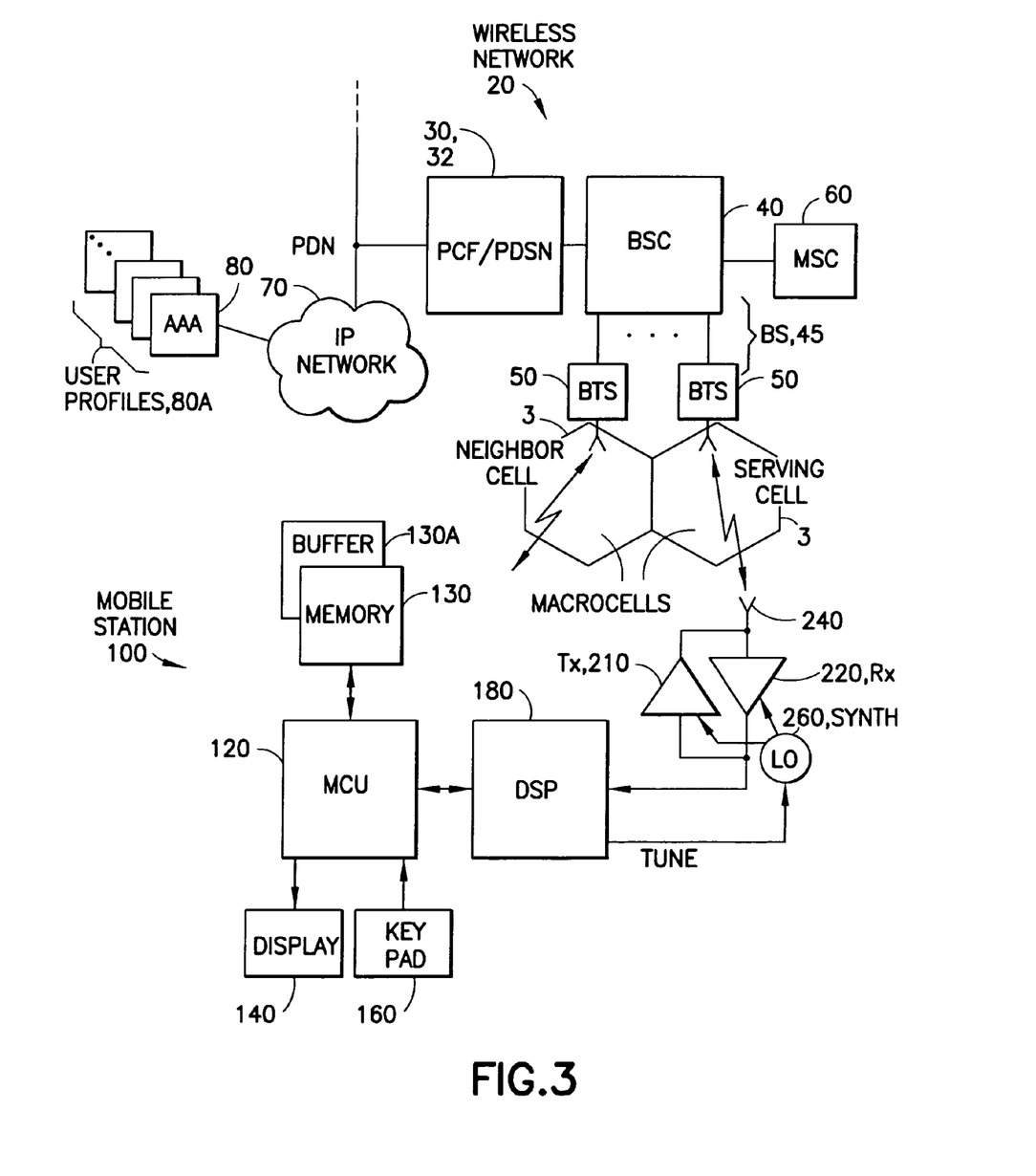
FIG. 3 is a block diagram of a MS coupled the wireless network, and illustrates one suitable embodiment of apparatus for practicing this invention.

By way of introduction, and referring to FIG. 3, there is shown as a simplified block diagram an embodiment of a wireless communications system that is suitable for practicing this invention. The wireless communications system includes at least one MS 100. FIG. 3 also shows an exemplary wireless network 20 having, for example, a PCF/PDSN 30, 32 depicted for simplicity as a single node for connecting to a Packet Data Network (PDN) and thence to an IP network 70, such as the Internet. The wireless network 20 also includes at least one BS 45 containing a BSC 40 or equivalent apparatus, and a plurality of BTSs 50, that transmit in a forward or downlink direction both physical and logical channels to the MS 100 in accordance with a predetermined air interface standard. A reverse or uplink communication path also exists from the MS 100 to the network 20, which conveys MS-originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available. Also shown is the MSC 60 on the voice side of the network 20, and an AAA server 80 on the data side. The AAA server 80 is assumed to store a plurality of user profiles 80A corresponding to individual users of the network 20. It should be appreciated that the wireless network 20 may be constructed as shown in FIGS. 1A and 1B, and may thus contain the same interfaces and other, non-illustrated components.

The air interface standard can conform to any suitable standard or protocol, and may enable both voice and data traffic, such as data traffic enabling Internet 70 access and web page downloads. The air interface standard may compatible with a 3GPP2-compatible standard, or a code division multiple access (CDMA) air interface standard, such as one known as cdma2000, although this is not a limitation upon the practice of this invention. For example, this invention could be employed in a CDMA 2000-802.11 (WLAN) interworking scenario.

The MS 100 typically includes a control unit or control logic, such as a microcontrol unit (MCU) 120 having an output coupled to an input of a display 140 and an input coupled to an output of a keyboard or keypad 160. The MS 100 may be a handheld radiotelephone, such as a cellular telephone or a personal communicator. The MS 100 could also be contained within a card or module that is connected during use to another device. For example, the MS 100 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, received zone ID information, and the like. At least some of this temporary data can be stored in a buffer 130A. The operating program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker are typically provided for enabling the user to conduct voice calls in a conventional manner, via the BS 45 and the MSC 60.

The MS 100 also contains a wireless section that includes a digital signal processor (DSP) 180, or equivalent high speed processor or logic, as well as a wireless transceiver that includes a transmitter 210 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, as well as signalling messages are transmitted and received through the antenna 240.

In accordance with this invention it becomes possible, from the data side of the network 20, to locate the MS 100 by a combination of BTS 50, BSC 40, PCF 30 and PDSN 32. Although not limited thereto, for convenience this invention employs the already-defined identifiers for a BTS 50, or a group of BTSs 50, and the controlling BSC 40, that were referred to above as the SPZ_ID, and for the PCF 30 the already defined PZID (see, again, the above-referenced C23-20030714-038R3 document). In order to identify the position of the MS 100 in the network 20 across the PDSNs (30, 32') the IP address of the pertinent one of the PDSNs is used as the identifier for the PDSN 32.

Figure 4:
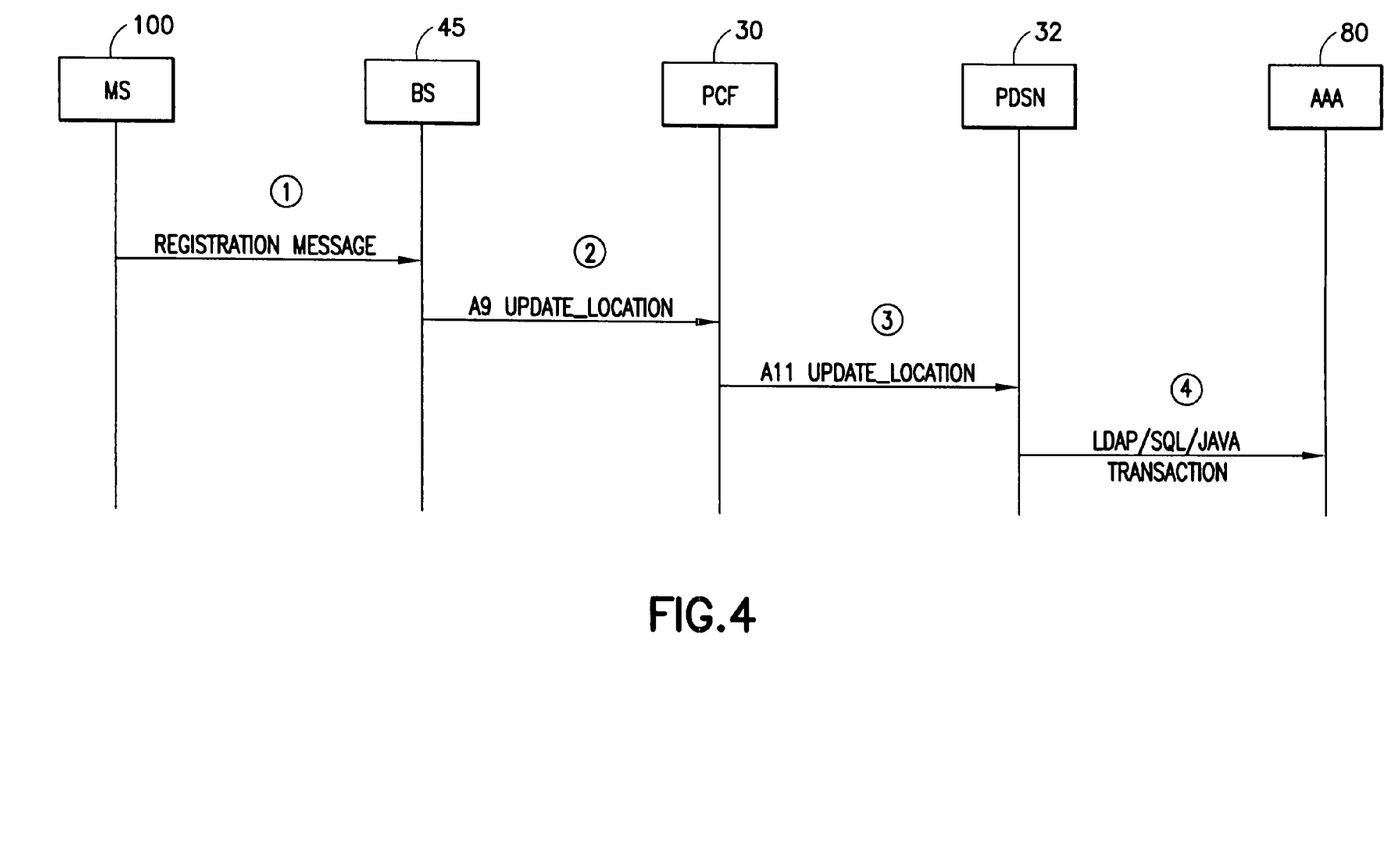
FIG. 4 is a signalling diagram that illustrates the operation of the MS and the wireless network in accordance with this invention.

A description is now made of a registration procedure on the data side of the network 20. Reference is also made to FIG. 4.

Step 1: The MS 100 sends a Registration message to the BS 45. The sending of the Registration message is triggered by the MS 100 moving to a different SPZ_ID zone and/or a different PZID, as detected by the MS 100 from the downlink message that is broadcast to include the SPZ_ID. The Registration message includes the SPZ_ID received by the MS 100 in the received downlink message that triggered the sending of the Registration message, since it differed from a previous SPZ_ID stored in the buffer memory 130A of the MS 100. In the preferred embodiment of this invention the Registration message is sent when the MS 100 is in the Idle state.

Step 2: The BS 45 sends an A9-Update_Location message to the PCF 30. The A9-Update_Location message includes the IMSI of the MS 100 and the SPZ_ID reported by the MS 100 in the Registration message.

Step 3: The PCF 30 selects a PDSN 32 based on a suitable PDSN 32 selection algorithm and forwards the location information to the selected PDSN 32 in an A11 Update_Location message. This message includes the IMSI, SPZ_ID and PZID information for the MS 100.

Step 4: The PDSN 32 updates a user profile (UP 80A) stored in the AAA server 80 to reflect the current SPZ_ID, PZID by using a LDAP interface, or a JAVA/SQL interface to the AAA server 80 (JAVA™ is a Trademark of Sun Microsystems, Inc.) LDAP defines a standard for defining a hierarchical directory structure, and a standard interface for accessing these directories. LDAP originated from the X.500 standard. A protocol such as LDAP can be used to access an X.500 directory. It is also within the scope of this invention to use a modified RADIUS interface that includes change information to be sent asynchronously to the AAA server 80.

The AAA server 80, if this is the home AAA server 80 for the MS 100 stores the SPZ_ID, PZID and the PDSN IP address for indicating the current location of the MS 100. If the AAA server is not the home AAA server 80, i.e., it is a visited AAA server 80', it forwards the SPZ_ID, PZID and the PDSN IP address information, along with the and identity of the MS 100 (e.g., the IMSI) to the home AAA server 80 possibly through one or more broker AAA servers 81 (see FIG. 1B).

As can be appreciated, this invention extends the use of the sub-paging zone information to the A8/A9 and the A10/A11 interface layers. This invention defines the location of the MS 100, from a data session perspective, to the association of the MS 100 with a certain BS 45/PCF 30/PDSN 32 combination. This beneficially aids in solving the network-initiated data session problem for MSs 100 that are roaming, even across PDSNs 32, by providing the home service network the ability to route the packets to the correct PDSN 32 or PCF 30.

The use of this invention also avoids the need to introduce new protocols between the packet data core network elements (the PDSN 32/AAA 80/HA 90) and the HLR 60 for determining the location of the MS 100. As was noted above, even if it is possible to consult the HLR 60 from the data side to determine the location of the MS 100, the HLR 60 is currently not defined so as to provide information that identifies the correct PDSN 32 with which the MS 100 is currently associated. Further, in that this invention may use existing air link messages, such as the Registration message as specified in the above-referenced document C23-20030714-038R3, there is no change required to the air interface.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent messages and message data elements may be attempted by those skilled in the art. Further, the various functional units and interfaces shown in FIGS. 1A, 1B and 3 may be supplemented or some may be removed, and the various units, functions and interfaces may be referred to by different names. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
    receiving, by a base station BS, a message from a mobile station MS within a wireless network, the message indicating a current location of the MS and that the MS is in an Idle state; and
    triggering the sending of further messages in the wireless network from the BS to a Packet Control Function PCF, and from the PCF to a Packet Data Serving Node PDSN, and from the PDSN to an Authentication, Authorization and Accounting AAA server, such that information that is indicative of a current BS/PCF/PDSN affiliation of the MS at the current location of the MS is recorded by the AAA server; and
    in response to an occurrence of a network initiated data session (NIDS) for the MS, querying the AAA server to obtain at least the information for the MS.

2. A method as in claim 1, where the MS is identified by its International Mobile Subscriber Identity IMSI, and where the PDSN is identified by its Internet Protocol IP address.

3. A method as in claim 1, further comprising, in response to a presence of packet data to be sent to the MS, querying the AAA server to obtain the current BS/PCF/PDSN affiliation of the MS.

4. A method as in claim 1, where the message comprises a sub-paging zone identifier of the MS, the method further comprising: comparing the received sub-paging zone identifier with a previously received sub-paging zone identifier, and detecting that the MS has changed its location in the wireless network when the received sub-paging zone identifier does not match with the previously received sub-paging zone identifier.

5. A method as in claim 1, where the information comprises a sub-paging zone identifier SPZ_ID, a paging zone identifier PZID, wad an Internet Protocol IP address of the PDSN.

6. A method comprising:
    in response to receiving a Registration message from a mobile station MS at a base station BS within a wireless network, the Registration message containing a sub-paging zone identifier SPZ_ED, sending further messages in the wireless network from the BS to a Packet Control Function PCF, from the PCF to a Packet Data Serving Node PDSN, and from the PDSN to an Authentication, Authorization and Accounting AAA server, such that information that is indicative of a current location of the MS is recorded by the AAA server; and
    in response to an occurrence of a network initiated data session (NIDS) for the MS, querying the AAA server to obtain at least the current location of the MS.

7. A method as in claim 6, where the MS is identified by its International Mobile Subscriber Identity IMSI, and where the PDSN is identified by its Internet Protocol if address.

8. A method as in claim 6, where the information comprises the sub-paging zone identifier SPZ_ID, a paging zone identifier PZID, and an Internet Protocol IP address of the PDSN.

9. A method as in claim 8, where querying comprises querying the AAA server to obtain at least the SPZ_ID, PZID and PDSN IP Address that are recorded for the MS.

10. A method as in claim 6, where the message sent from the PDSN to the AAA server is sent via a Lightweight Directory Access Protocol LDAP interface.

11. A method as in claim 6, where the message sent from the PDSN to the AAA server is sent via a JAVA/SQL interface.

12. A method as in claim 6, where the message sent from the PDSN to the AAA server is sent via a visited AAA server.

13. A method as in claim 6, where the message sent from the PDSN to the AAA server is sent via at least one broker AAA server.

14. A method as in claim 6, where the message sent from the PCF to the PDSN is sent via an A10/A11 interface.

15. A wireless network operable with a mobile station MS, comprising a base station BS, responsive to receiving a Registration message from a MS that contains a sub-paging zone identifier SPZ_ID, for sending a message from the BS to a Packet Control Function PCF via an A8/A9 interface, said PCF, in response to receiving the message from the BS, for sending a message to a Packet Data Serving Node PDSN via an A10/A11 interface, said PDSN, responsive to receiving the message from the PCF, for sending a message to a home Authentication, Authorization and Accounting AAA server via one of a Lightweight Directory Access Protocol LDAP interface or a JAVA/SQL interface, said home AAA sewer recording information that is indicative of a current location of the MS, and further being responsive to a query received in response to an occurrence of a network initiated data session (NIDS) for the MS, for returning at least the current location of the MS.

16. A wireless network as in claim 15, where the MS is identified by its International Mobile Subscriber Identity IMSI, and where the PDSN is identified by its Internet Protocol IP address.

17. A wireless network as in claim 15, where the information comprises the sub-paging zone identifier SPZ_ID, a paging zone identifier PZID, and an Internet Protocol IP address of the PDSN.

18. A wireless network as in claim 17, where querying comprises querying the home AAA server to obtain at least the SPZ_ID, PZID and PDSN IP Address that are recorded for the MS.

19. A wireless network as in claim 15, where the message sent from the PDSN to the home AAA server is sent via a visited AAA server.

20. A wireless network as in claim 15, where the message sent from the PDSN to the home AAA server is sent via at least one broker AAA server.

21. A base station BS operable in a wireless network for receiving a Registration message from a mobile station MS, the Registration message containing a sub-paging zone identifier SPZ_ID, said ES, in response to receiving the Registration message, triggering the sending of further messages in the wireless network from the BS to a Packet Control Function PCF, and from the PCF to a Packet Data Serving Node PDSN, and from the PDSN to a home Authentication, Authorization and Accounting AAA sewer, such that information that is indicative of a current location of the MS is sent to the home AAA server, and further being responsive to a query received in response to an occurrence of a network initiated data session (NIDS) forte MS, for returning at least the current location of the MS for enabling data to be received by the MS at its current location via the BS.

22. A BS as in claim 21, where the MS is identified by its International Mobile Subscriber Identity IMSI, and where the PDSN is identified by its Internet Protocol IP address.

23. A BS as in claim 21, where the information comprises the sub-paging zone identifier SPZ_ID, a paging zone identifier PZID, and an Internet Protocol IP address of the PDSN.

24. A BS as in claim 21, where the message sent from the PDSN to the home AAA server is sent via at least one of a visited AAA server and a broker AAA server.

\* \* \* \* \*

UNITED STATES PATENT AND TRADEMARK OFFICE
CERTIFICATE OF CORRECTION

PATENT NO. : 7,593,364 B2  Page 1 of 1
APPLICATION NO. : 10/722964
DATED : September 22, 2009
INVENTOR(S) : Asthana It is certified that error appears in the above-identified patent and that said Letters Patent is hereby corrected as shown below:

In The Claims:

Claim 5, column 8, line 15, delete "wad" and replace with --and--.

Claim 6, column 8, line 20, delete "SPZ_ED" and replace with --SPZ_ID--.

Claim 7, column 8, line 32, please delete "if" and replace with --IP--.

Claim 15, column 8, line 65, please delete "sewer" and replace with --server--.

Claim 21, column 10, line 2, please delete "ES" and replace with --BS--.

Claim 21, column 10, line 7, please delete "sewer" and replace with --server--.

Claim 21, column 10, line 11, please delete "forte" and replace with --for the--.

Signed and Sealed this

Twenty-second Day of December, 2009

David J. Kappos
*Director of the United States Patent and Trademark Office*